(12) United States Patent
Lee

(10) Patent No.: US 9,529,498 B2
(45) Date of Patent: Dec. 27, 2016

(54) INPUT PROCESSING APPARATUS AND METHOD USING A USER INTERFACE

(71) Applicant: Samsung Electronics Co., Ltd., Gyeonggi-do (KR)

(72) Inventor: Jeongpyo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 152 days.

(21) Appl. No.: 14/184,040

(22) Filed: Feb. 19, 2014

(65) Prior Publication Data

US 2014/0237424 A1 Aug. 21, 2014

(30) Foreign Application Priority Data

Feb. 19, 2013 (KR) .................. 10-2013-0017269

(51) Int. Cl.
*G06F 3/048* (2013.01)
*G06F 3/0482* (2013.01)
*G06F 3/0481* (2013.01)
*G06F 3/0488* (2013.01)

(52) U.S. Cl.
CPC .......... *G06F 3/0482* (2013.01); *G06F 3/0481* (2013.01); *G06F 3/04883* (2013.01); *G06F 3/04886* (2013.01)

(58) Field of Classification Search
CPC  G06F 3/04886; G06F 3/04883; G06F 3/0481; G06F 9/4446; G06F 3/0482; G06F 3/017
USPC ................. 715/773, 809, 810, 863
See application file for complete search history.

(56) References Cited

U.S. PATENT DOCUMENTS

| | | | | |
|---|---|---|---|---|
| 8,866,772 | B2* | 10/2014 | Konami | G06F 3/04883 715/863 |
| 2002/0191029 | A1 | 12/2002 | Gillespie et al. | |
| 2009/0303187 | A1* | 12/2009 | Pallakoff | G06F 3/0488 715/773 |
| 2013/0091474 | A1* | 4/2013 | Liu | G06F 3/0488 715/863 |
| 2014/0109004 | A1* | 4/2014 | Sadhvani | G06F 3/0482 715/810 |

* cited by examiner

*Primary Examiner* — Haoshian Shih
(74) *Attorney, Agent, or Firm* — The Farrell Law Firm, P.C.

(57) ABSTRACT

An input processing apparatus and method using a user interface is provided. A display unit provides visual information on operation of the terminal, and a control unit controls the terminal to display a dialog configured to receive an input of a command and to perform an operation corresponding to an input command if the command corresponding to the dialog is input through an auxiliary input region on the display unit other than a region where the dialog is displayed.

16 Claims, 9 Drawing Sheets

INPUT PROCESSING APPARATUS AND METHOD USING A USER INTERFACE

PRIORITY

This application claims priority under 35 U.S.C. §119(a) to a Korean patent application filed on Feb. 19, 2013 in the Korean Intellectual Property Office and assigned Serial No. 10-2013-0017269, the contents of which are incorporated herein by reference.

BACKGROUND OF THE INVENTION

1. Field of the Invention

The present invention relates generally to an input processing apparatus and method using a user interface, and more particularly, to an input processing apparatus and method using a user interface that requests a user to make an input corresponding to execution of a program, and processes a user command input through various input means.

2. Description of the Related Art

While a terminal performs an operation, such as execution of a program, a user input for a subsequent operation is typically requested. For example, after a user inputs a deletion command of specific data, a user's confirmation command is often input before the terminal actually executes a deletion operation, or a user's selection command for the subsequent process is input as a specific situation, such as a program error, occurs in the terminal.

In such a case, the terminal displays a popup window-type dialog configured to receive an input of a confirmation command or a selection command from a user on a screen, and then the user inputs the confirmation command or the selection command by selecting a button included in the popup window-type dialog. However, such a dialog is generally displayed with a much smaller size than the size of the entire screen of the terminal.

Recently, with the performance improvement of portable terminals and a user demand, a portable terminal provided with a display as large as that of a tablet Personal Computer (PC) has become popular. Accordingly, it is typically difficult for a user to control the portable terminal with one hand, and the configuration that the user should input a command only through a specific region of the dialog is problematic, particularly in a portable terminal having a touch type display.

SUMMARY OF THE INVENTION

The present invention has been made in an effort to solve the above-described problems in the prior art, and it is an aspect of the present invention to provide an input processing apparatus and method for efficiently inputting a user command corresponding to a displayed dialog, to enhance the user convenience of a portable terminal.

In accordance with an aspect of the present invention, an input processing apparatus for controlling an operation of a terminal according to an input command includes a display unit configured to provide visual information, and a control unit configured to control the display unit to display a dialog configured to receive an input of a command through an input region thereof, and to receive a command corresponding to the dialog that is input through an auxiliary input region on the display unit, other than a region where the dialog is displayed, to perform an operation corresponding to the dialog.

In accordance with an aspect of the present invention, an input processing method for controlling an operation of a terminal according to an input command includes displaying a dialog configured to receive an input of a command through an input region thereof, receiving an input of a command corresponding to the dialog through an auxiliary input region that is set in a display region other than a region where the dialog is displayed, and controlling the terminal to perform an operation corresponding to the command.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Figure 1:
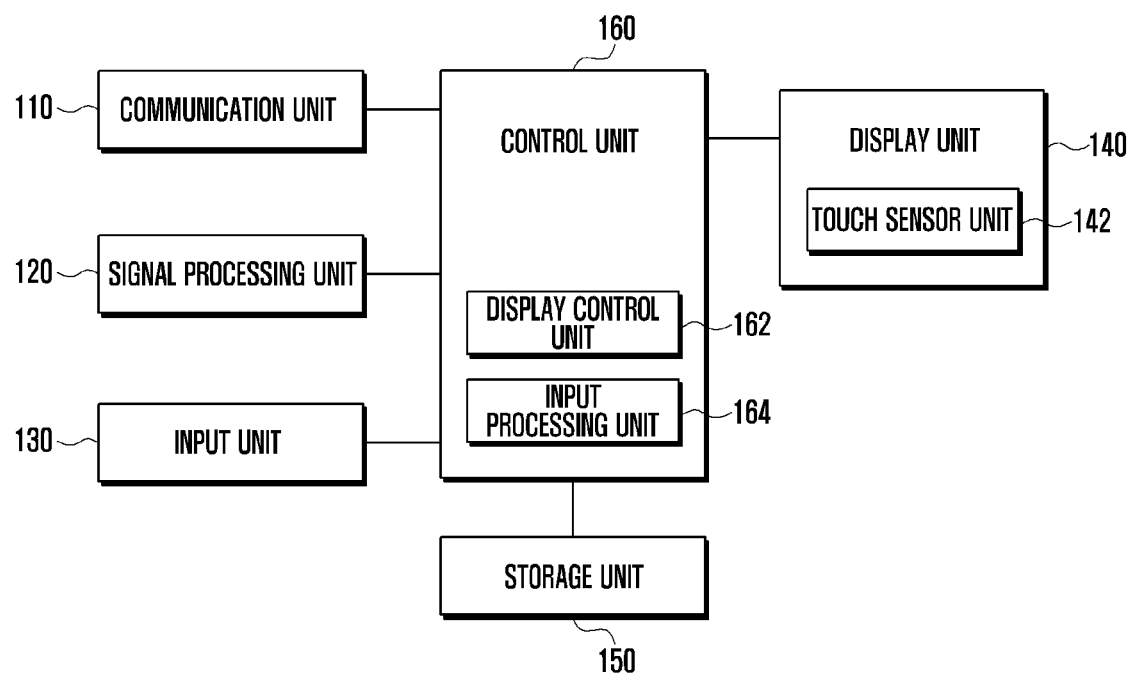
FIG. 1 illustrates the internal configuration of a terminal according to an embodiment of the present invention.

Hereinafter, various embodiments of the present invention will be described in detail with reference to the accompanying drawings. In the accompanying drawings, the same reference numerals are used for the same constituent elements. A detailed description of well-known functions and structures incorporated herein is omitted to avoid obscuring the subject matter of the present invention.

A portable terminal, such as a tablet PC and a smart phone, that is provided with a touch type display will be a primary subject in describing embodiments of the present invention in detail. However, the embodiments of the present invention can also be applied to other terminals adopting similar technology, with a slight modification, within a range that does not substantially deviate from the scope of the present invention, according to one skilled in the art.

FIG. 1 illustrates a terminal according to an embodiment of the present invention.

Referring to FIG. 1, a terminal 100 includes a communication unit 110, a signal-processing unit 120, an input unit 130, a display unit 140, a storage unit 150, and a control unit 160.

The communication unit 110 performs data transmission and reception for communication of the terminal 100. The communication unit 110 includes a Radio Frequency (RF) transmitter (not shown) that up-converts the frequency of a transmitted signal and amplifies the signal, and an RF receiver (not shown) that amplifies the received signal with low noise and down-converts the amplified signal. The communication unit 110 receives data through a wire/wireless channel, outputs the received data to the control unit 160, and transmits data received from the control unit 160 through the wire/wireless channel.

The terminal 100 according to an embodiment of the present invention does not require a communication function to be provided by means of the communication unit 110, and the present invention is also applicable to a terminal that is not provided with the communication function.

The signal-processing unit 120 includes a codec (not shown), and converts a digital signal into an analog signal, and vice versa, through the codec. In the present invention, the signal-processing unit 120 processes signals input through the input unit 130 or the display unit 140 and transmits the processed input to the control unit 160, to operate the terminal 100.

The input unit 130 receives an input of a user operation for controlling the terminal 100, and generates and transmits an input signal to the control unit 160. The input unit 130 is implemented as a keypad including numeral keys and direction keys, or a mouse device. When the terminal 100 is a portable device, a function key is integrally formed with the display unit 140 according to an embodiment of the present invention. When the display unit 140 is implemented as a touch type display, the key input unit 140 is minimized or omitted.

The display unit 140 visually provides a menu of the terminal 100, input data, function setting information, and other information to the user. The display unit 140 functions to output a booting screen of the terminal 100, an idle screen, a menu screen, a phone call screen, and other application screens. In an embodiment of the present invention, the dialog configured to receive an input of the user command is provided to the user through the display unit 140.

The display unit 140 is formed of a Liquid Crystal Display (LCD), an Organic Light Emitting Diode (OLED), an Active Matrix Organic Light Emitting Diode (AMOLED), a flexible display, or a Three-Dimensional (3D) display.

When the display unit 140 is implemented as a touch type display, the display unit 140 is further provided with a touch sensor unit 142. The touch sensor unit 142 converts a change of pressure that is applied to a specific region of the display unit 140 or capacitance that occurs at the specific region into an electrical input signal. In this case, the touch sensor unit 142 can detect both the position and the region being touched as well as touch pressure.

That is, the touch sensor unit 142 senses the user's touch input, and generates and transfers a sensing signal to the control unit 160. The sensing signal includes coordinate information of the position touched by the user. If the user moves the touched position (drags) when the user is touching the display unit, the touch sensor unit 142 generates and transfers the sensing signal that includes the coordinate information of a movement path to the control unit 160.

The touch sensor unit 142 includes pressure sensors, or capacitive overlay, resistive overlay, surface acoustic wave, or infrared beam type touch sensors. In addition, the touch sensor unit 142 according to the present invention can include any type of sensor device that can sense contact with an object or pressure.

The storage unit 150 serves to store programs that are necessary for the operation of the terminal 100 and data, and is divided into a program region and a data region. The program region can store programs for controlling the entire operation of the terminal 100, an Operating System (OS) for booting the portable terminal 100, application programs that are necessary for reproduction of multimedia content, and application programs that are necessary for other optional functions of the terminal 100, for example, voice conversation, camera, sound reproduction, and image or moving image reproduction functions. The data region is configured to store data generated according to the use of the terminal 100, images, moving images, phone book, and audio data.

The control unit 160 controls the overall operation of the respective constituent elements of the terminal 100. In an embodiment of the present invention, the control unit 160 includes a display control unit 162 and an input processing unit 164, wherein if an input of a user command is to be received, the display control unit 162 controls the display unit 140 to display a dialog in which one or more selection buttons are included. If a user command that corresponds to the displayed dialog is input through the input unit 130 or the display unit 140, the input processing unit 164 controls the terminal 100 to perform the operation according to the user command.

Particularly, in accordance with an embodiment of the present invention, if the user command is input through a region other than a dialog region of the display unit 140 that is a touch type display, rather than through the selection button of the dialog, the input processing unit 164 of the control unit 160 controls the terminal 100 to analyze the input pattern and to perform the corresponding operation. In this case, the user's input patterns and the corresponding operations of the terminal 100 are pre-stored in the storage unit 150.

Figure 2:
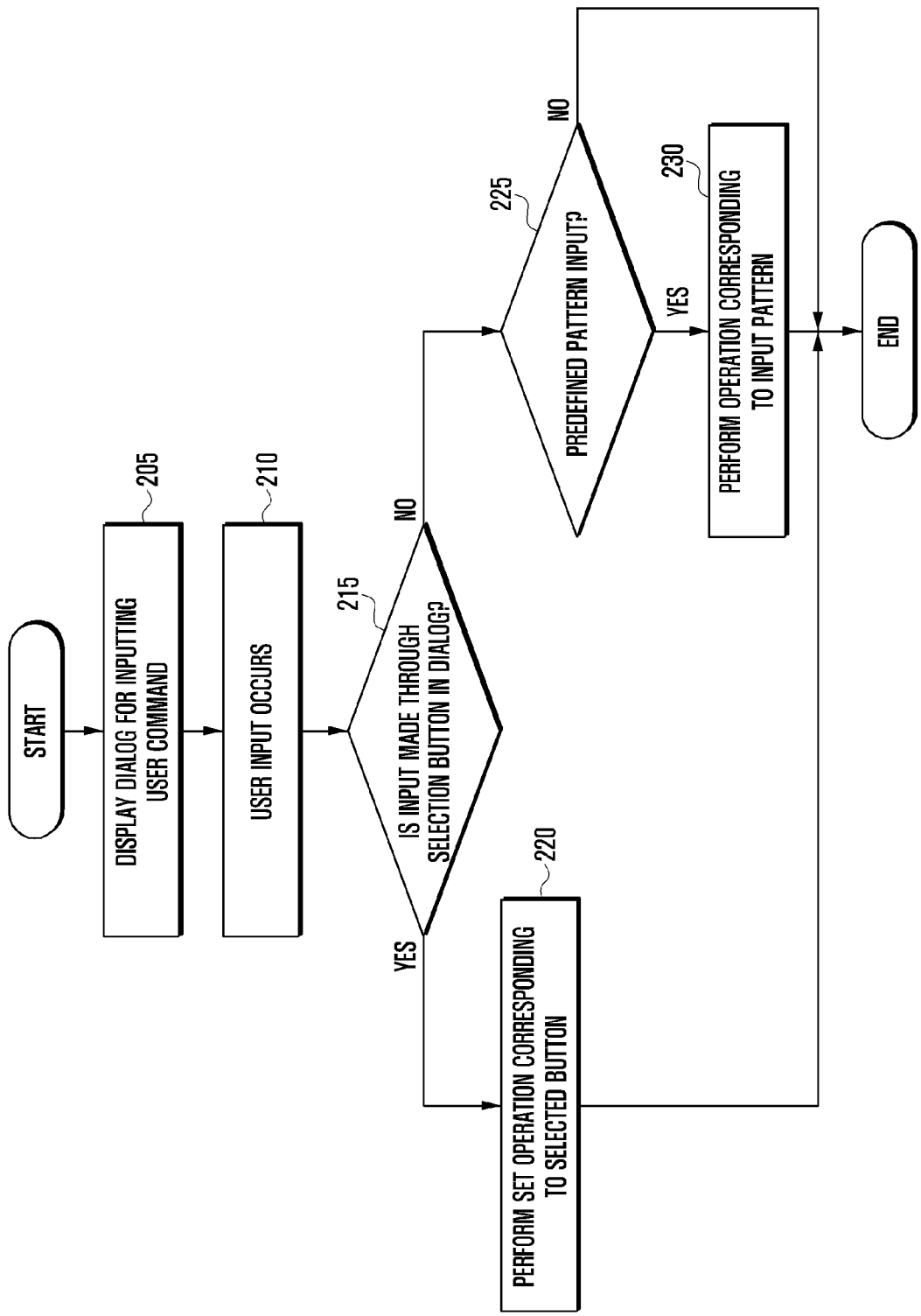
FIG. 2 illustrates an input processing procedure according to an embodiment of the present invention.

FIG. 2 illustrates an input processing procedure according to an embodiment of the present invention.

Referring to FIG. 2, the control unit 160 displays a dialog configured to receive an input of a user command through the display unit 140 in step 205. Description of the procedure of FIG. 2 will be resumed after a detailed description of step 205 is given.

Figure 3:
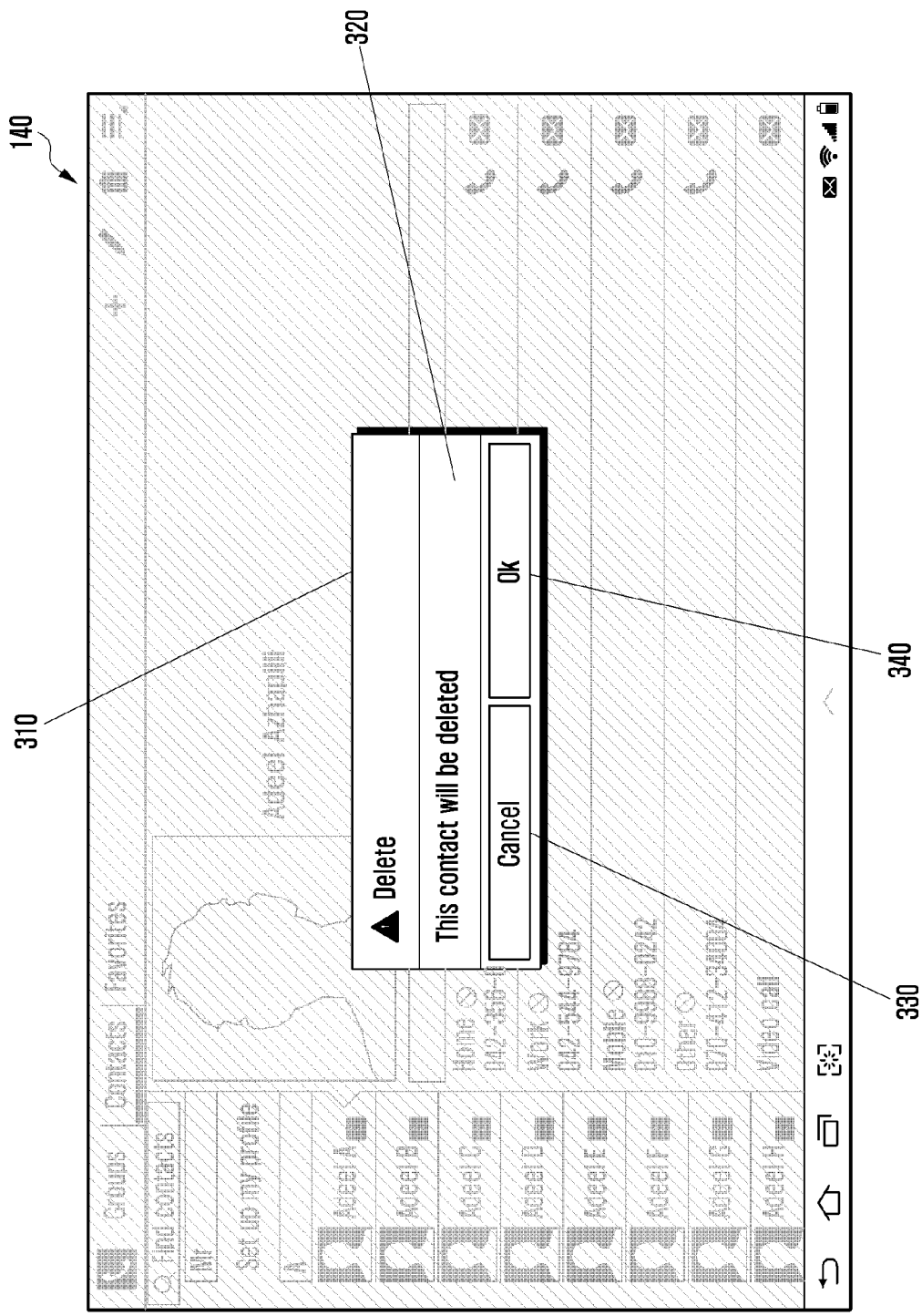
FIG. 3 illustrates a configuration in which a dialog is displayed through a display unit according to an embodiment of the present invention.

Particularly, FIG. 3 illustrates a configuration in which a dialog is displayed through the display unit 140 according to an embodiment of the present invention.

Referring to FIG. 3, the user's additional input is required while the terminal 100 executes a specific program or application. For example, a user may execute a directory application of the terminal 100, select a specific contact address, and then input a deletion command for deleting the selected contact address.

If the commands for selecting and deleting the contact address are sequentially input from the user, the control unit 160 receives an input of a confirmation command for finally confirming the deletion of the contact address from the user before actually performing the deletion of the contact address. Accordingly, the control unit 160 displays a dialog 310 configured to receive an input of the confirmation command from the user on the display unit 140.

As illustrated in FIG. 3, the dialog 310 is displayed in the form of a popup window on a partial region of the display unit 140, and preferably, in the center of the display unit 140. In the dialog 310, a message region 320 for explaining the operation to be performed according to the input from the user, for example, for explaining the deletion operation of the contact address, is included, and the user can confirm the operation to be performed in the terminal through a message that is displayed on the message region 320 of the dialog 310.

The dialog 310 includes selection buttons 330 and 340 for displaying regions in which the user actually inputs the user command. If the display unit 140 is a touch type display, the user may touch the region that corresponds to the selection button 330 or 340, so that the terminal 100 performs the corresponding operation according to the user command.

The types of commands that the user intends to input are displayed on the selection buttons 330 and 340. As illustrated in FIG. 3, if the user intends to cancel the operation to be currently performed in the terminal 100, the user touches the region that corresponds to the "cancel" button 330, whereas if the user intends to execute the corresponding operation, the user touches the region that corresponds to the confirmation button 340 to cause the terminal 100 execute the corresponding operation.

Referring again to FIG. 2, if an input according to a user's touch occurs in step 210, after the dialog 310 is displayed, the control unit 160 confirms whether the user input is made through the selection buttons 330 and 340 in the dialog 310 in step 215. If it is confirmed that the user command is input through the selection buttons 330 and 340, the control unit 160 controls the terminal 100 to perform the operation to correspond to the selected one of the buttons 330 and 340 in step 220. For example, if the user input after the above-described contact address deletion command is the confirmation command through the touch of the confirmation button 340, the control unit 160 controls the terminal 100 to delete the selected contact address.

Referring back to FIG. 3, if the user command is input only through the selection buttons 330 and 340 of the dialog 310, the region other than that of the dialog 310 is deactivated while the dialog 310 is displayed on the display unit 140, and any input through a region except for the selection buttons 330 and 340 of the dialog 310 is invalidated.

For example, if the terminal 100 executes an application before the dialog 310 is displayed, an execution screen of the application is displayed on the display unit 140, and various menu keys that the user can select are included on the execution screen. Thereafter, if an operation that requires user's additional input occurs, the control unit 160 displays the dialog 310 to overlap the execution screen of the display unit 140, and performs a blurring process with respect to the execution screen that corresponds to the region other than that of the dialog 310 to indicate that the execution screen is in a deactivated state. Accordingly, even if the user's touch operation occurs with respect to a menu key included in the execution screen, the corresponding input is invalidated and thus cannot cause the terminal 100 to perform an operation.

However, as described above, as the display size of the portable device increases, the user is unable to control the terminal 100 with one hand, causing the user to realize the difficulty of the operation.

As described above, the fact that the command can be input only through the selection buttons 330 and 340 in the dialog 310 as shown in FIG. 3 when it is difficult for the user to control the portable terminal with one hand due to the size of the portable terminal, causes a waste through non-use of the deactivated region outside the region of the dialog 310, and detrimentally affects the difficulty of the user's operation of the device.

The terminal 100 according to an embodiment of the present invention diversifies the input method corresponding to the dialog 310 in order to solve the above-described problems, and allows the user to more easily operate the portable device.

Specifically, instead of the region other than that of the dialog 310 on the display unit 140 becoming deactivated, an auxiliary input region, in which the user input can be effectively processed, is created in a region other than that of the dialog 310. If a user command that is input through the auxiliary input region has a predefined pattern, the control unit 160 can control the terminal 100 to perform an operation according to the corresponding command.

Referring back to FIG. 2, if it is determined that the user input is not made through the selection buttons 330 and 340 in the dialog 310 in step 215, the control unit 160 determines whether the corresponding input corresponds to the input of a predefined pattern in step 225. If the input corresponds to the predefined input pattern, the control unit 160 controls the terminal 100 to perform the operation that corresponds to the defined input pattern in step 230.

The auxiliary input region is the entire region other than the region that corresponds to the dialog 310 on the display unit 140, or a limited region of the region other than that of the dialog 310 is set as the auxiliary input region. The auxiliary input region is set as divided regions of which the number corresponds to the number of selection buttons 330 and 340 included in the dialog 310.

When the limited region is set as the auxiliary input region and it is determined that the user command is not input through the selection buttons 330 and 340 in the dialog 310 in step 215 of FIG. 2, the control unit 160 additionally determines whether the input is made through the auxiliary input region.

Figure 4A:
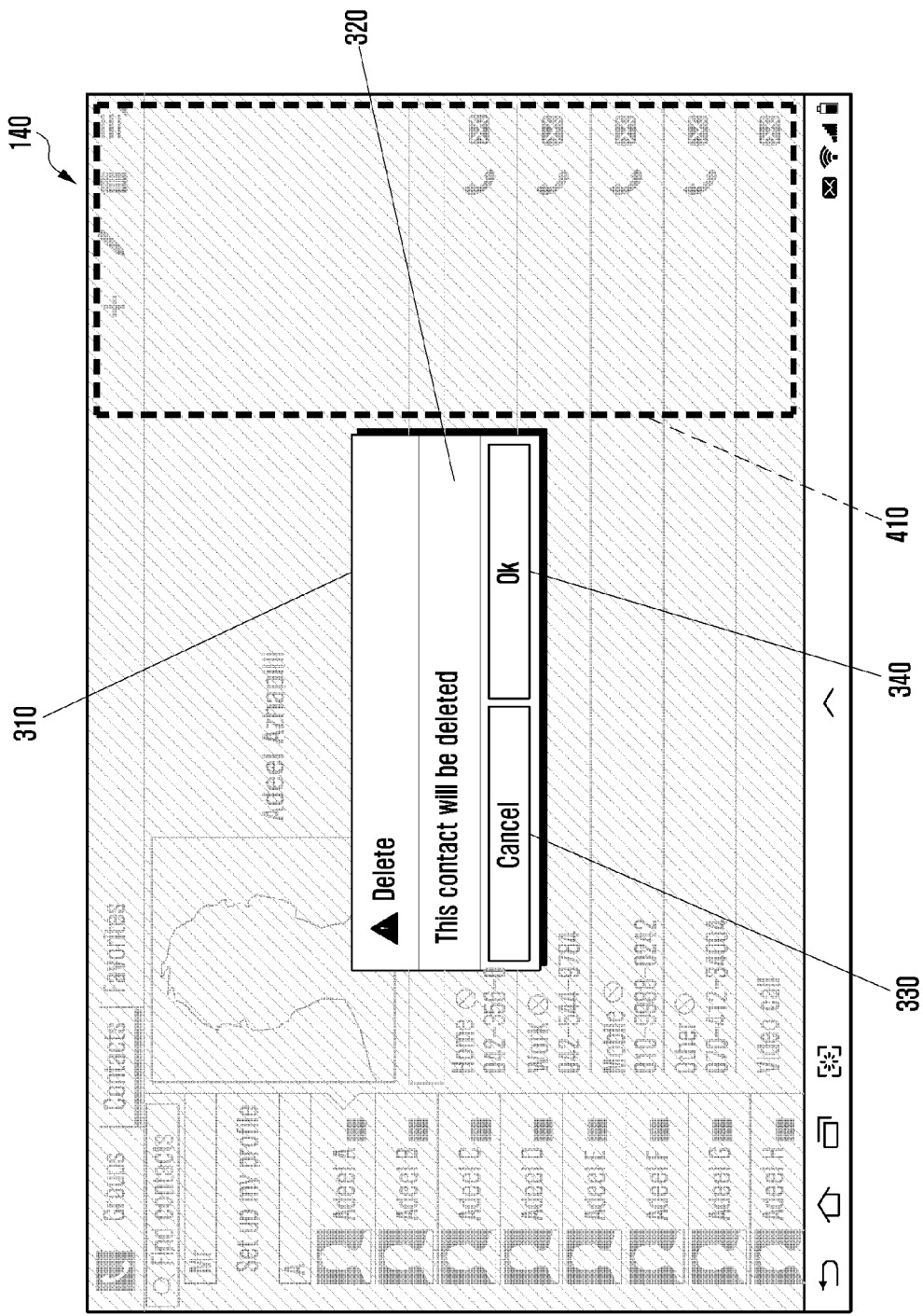
FIGS. 4A to 4C illustrate an embodiment in which an auxiliary input region is set in a region other than that of a dialog of a display unit.
Figure 4B:
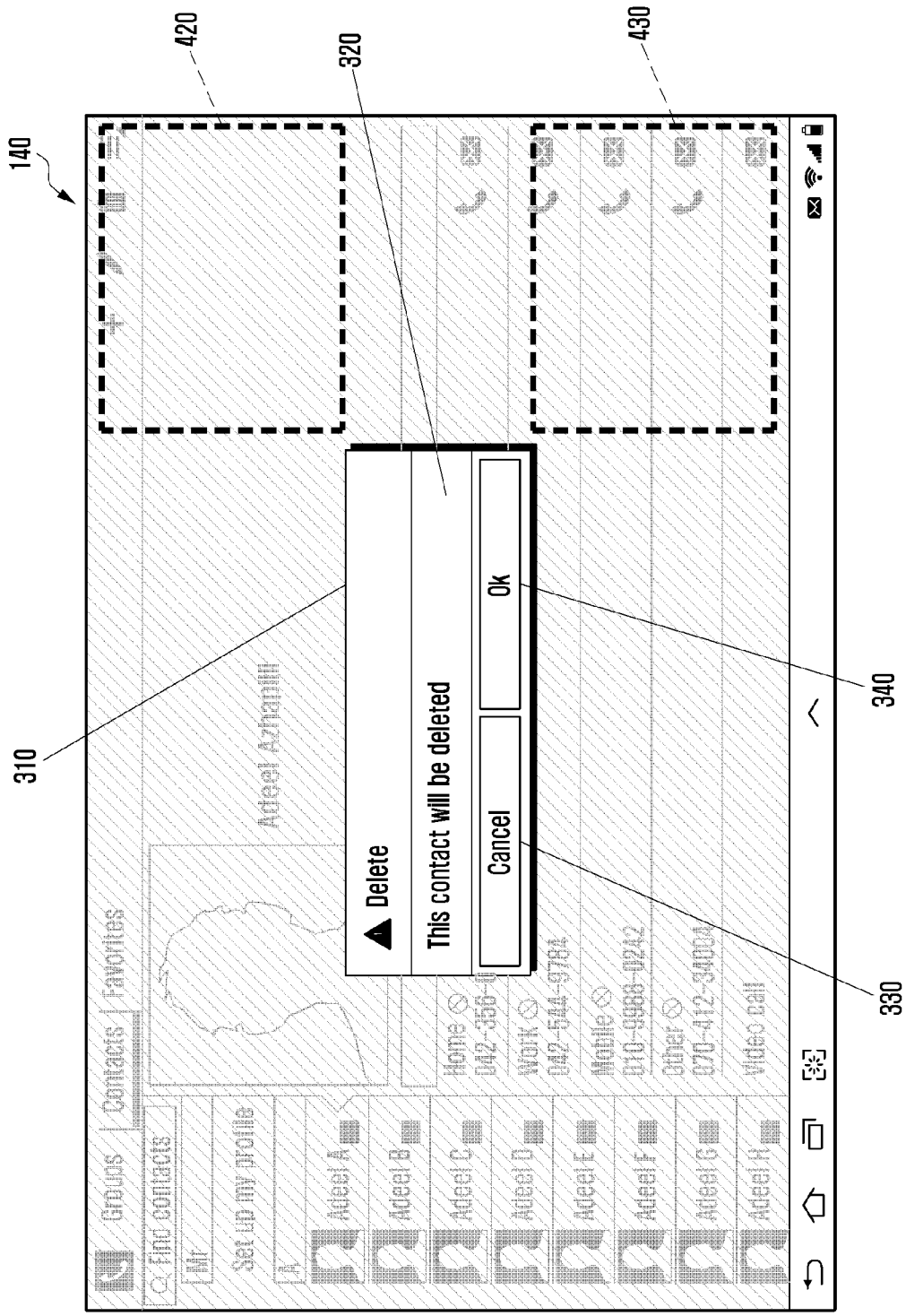
Figure 4C:
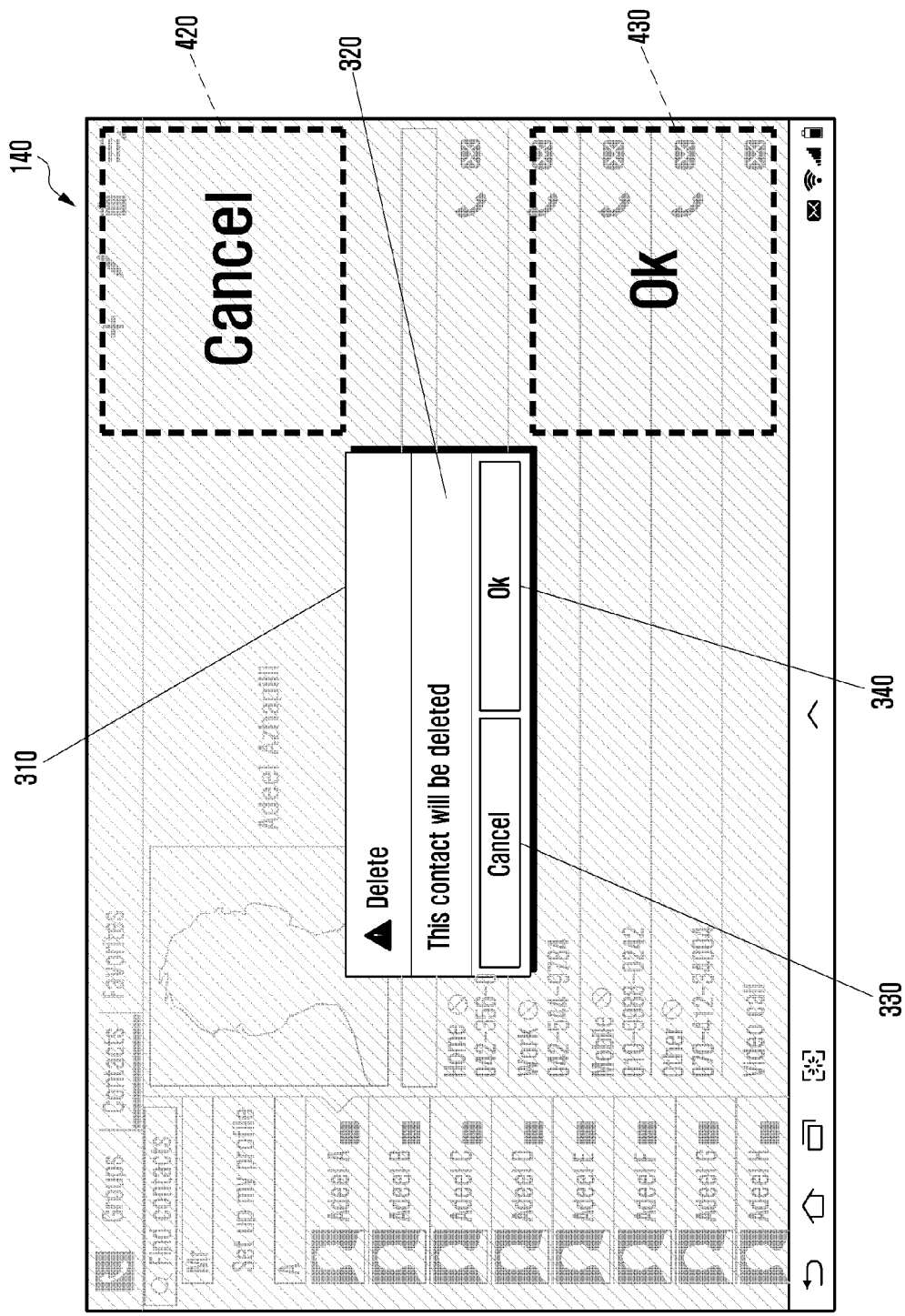

FIGS. 4A to 4C illustrate an embodiment in which an auxiliary input region is set in a region other than that of a dialog 310 of a display unit 140.

Referring to FIG. 4A, a part of the region other than the region in which the dialog 310 is displayed in the display unit 140 is set as an auxiliary input region 410. In FIG. 4A, the auxiliary input region 410 is set as one region, and the control unit 160 processes a user input through the auxiliary input region 410 in the same manner as an input through the selection buttons 330 and 340 of the dialog 310.

FIG. 4B illustrates when a plurality of auxiliary input regions 410 are set, wherein two auxiliary input regions 420 and 430 are set in the region other than the region in which the dialog 310 of the display unit 140 is displayed. The two auxiliary input regions 420 and 430 are set to correspond to the two selection buttons 330 and 340 included in the dialog 310, and the control unit 160 performs the corresponding operation depending on which of the auxiliary input regions 420 and 430 the user input is made through.

If the auxiliary input regions 410, 420, and 430 are separately set as described above, the control unit 160 displays the positions of the auxiliary input regions 410, 420, and 430 and the types of commands that can be input through the corresponding auxiliary input regions 410, 420, and 430, to improve user convenience.

Specifically, as illustrated in FIG. 4C, if the two auxiliary input regions 420 and 430 are set in the display unit 140, the control unit 160 displays which one of the two selection buttons 330 and 340 of the dialog 310 corresponds to each of the auxiliary input regions 420 and 430. In an embodiment illustrated in FIG. 4C, "Cancel" is displayed in the upper auxiliary input region 420 in order to indicate that the region 420 corresponds to the selection button 330 configured to receive an input of the "cancel" command of the selection buttons 330 and 340, and "OK" is displayed in the lower auxiliary input region 430 in order to indicate that the region 430 corresponds to the selection button 340 configured to receive an input of the "OK" command.

In FIGS. 4A to 4C, the auxiliary input regions 410, 420, and 430 are set on the right side of the display unit 140. However, the positions of the auxiliary input regions 410, 420, and 430 are not limited thereto, and are changeable within the display unit 140 in accordance with the user's setting, for example, in accordance with a right-handed person or a left-handed person.

If the auxiliary input regions 410, 420, and 430 are set as described above, the user's input patterns through the auxiliary input regions 410, 420, and 430 are predefined, and different commands are set according to the input patterns. The predefined input patterns and the corresponding operation of the terminal 100 may be pre-stored in the storage unit 150, and the definition of new input patterns or the operation setting according to the input patterns may be changed according to the user's setting in addition to the settings made during manufacture of the terminal 100.

If specific input patterns to be input through the auxiliary input regions 410, 420, and 430 are defined, the control unit 160 determines whether the user's input pattern through the auxiliary input region 410, 420, or 430 corresponds to a predefined pattern, and if so, the control unit 160 controls the operation of the terminal 100 in accordance with the set command to correspond to the input pattern.

When an input through the selection buttons 330 and 340 of the dialog 310, the selection buttons 330 and 340, of which the number corresponds to the number of commands that can be input from the user, are displayed, and thus the input pattern is limited to the user's touch operation only. However, if the auxiliary input regions 410, 420, and 430 are separately set, the input patterns, of which the number corresponds to the types of user commands to be input, are predefined so that they correspond to the respective commands.

Specifically, when the display unit 140 is a touch type display, the user's input patterns are variously defined according to the number of touches, time for which the touch state is maintained, and drag direction after the touch.

Figure 5:
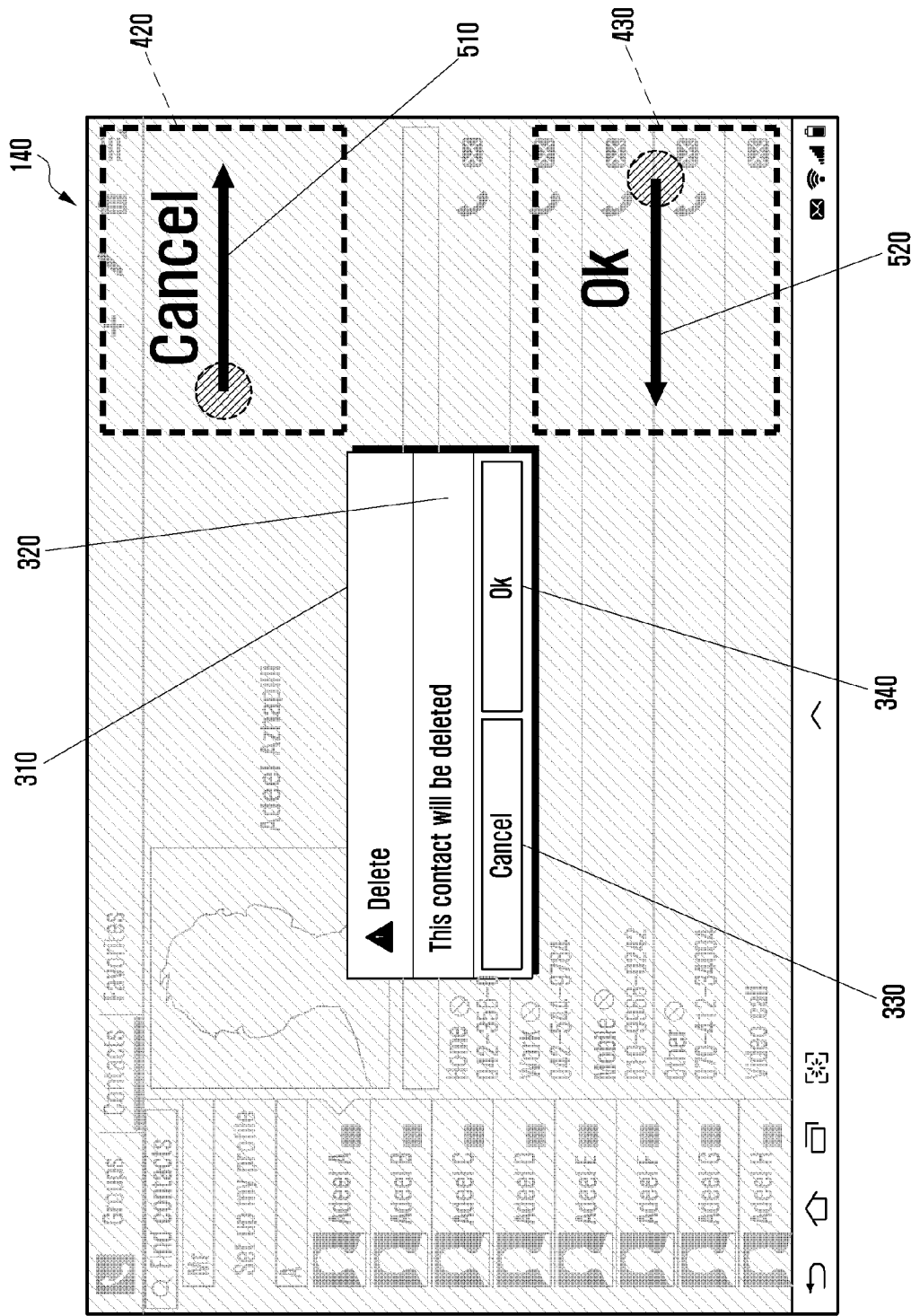
FIG. 5 illustrates when user's input patterns through auxiliary input regions are pre-defined according to an embodiment of the present invention.

FIG. 5 illustrates when a user's input patterns through auxiliary input regions 410, 420, and 430 are pre-defined according to an embodiment of the present invention.

Referring to FIG. 5, two auxiliary input regions 420 and 430 are set in the region other than the region that corresponds to the dialog 310 in the display unit 140, to correspond to the two selection buttons 330 and 340 included in the dialog 310.

In FIG. 5, the user input patterns are set differently with respect to the respective auxiliary input regions 420 and 430. Specifically, the upper auxiliary input region 420 is configured to receive an input of a command that corresponds to the "cancel" selection button 330 of the dialog 310. If the user drags in the rightward direction from when the user touches the left side of the upper auxiliary input region 420, the control unit 160 determines that the same command as that input by a touch of the "cancel" selection button 330 of the dialog 310 is input, and controls the corresponding operation of the terminal 100.

If the user drags in the leftward direction from when the user touches the right side of the lower auxiliary input region 430, the control unit 160 determines that the same command as that input by a touch of the "OK" selection button 340 of the dialog 310 is input, and controls the corresponding operation of the terminal 100.

The control unit 160 displays explanation of the user's input patterns through the display unit 140 in the same manner as the display of the explanation of the auxiliary input regions 420 and 430 through the display unit 140 as shown in FIG. 4C.

That is, as illustrated in FIG. 5, the control unit 160 displays an arrow 510 for indicating the drag input in the rightward direction and an explanation phrase "Cancel" in the upper auxiliary input region 420, and displays an arrow 520 for indicating the drag input in the leftward direction and an explanation phrase "OK" in the lower auxiliary input region 430.

FIG. 5 illustrates when different input patterns are defined to correspond to a plurality of auxiliary input regions 420 and 430 that are set at different positions of the display unit 140 according to an embodiment of the present invention. However, the present invention is not limited thereto, and even when the auxiliary input regions 410, 420, and 430 are not limited to a specific region or are set as only one region, the different input patterns are defined, and different input patterns having different input positions in one auxiliary input region 410, 420, or 430 are defined.

Figure 6:
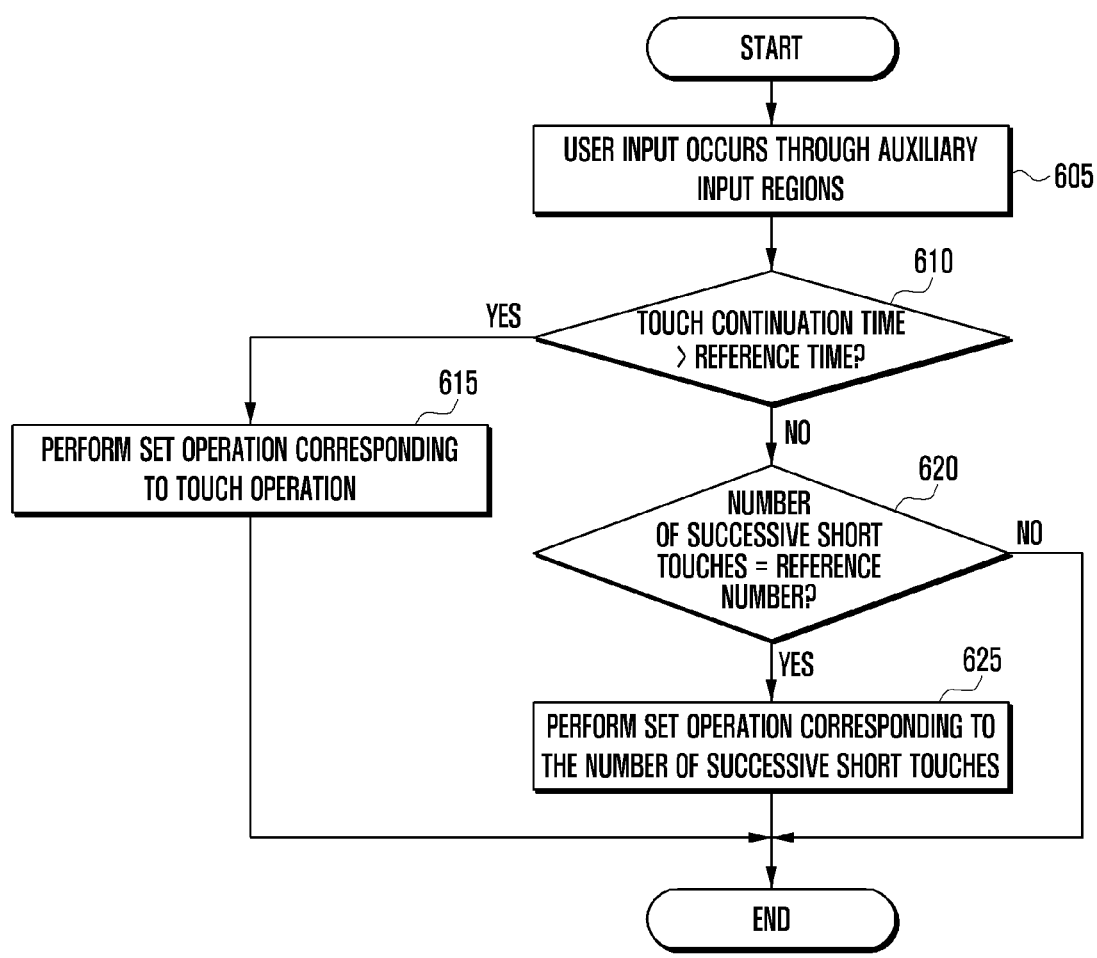
FIG. 6 illustrates a processing procedure when different user's input patterns are defined through different setting of a touch continuation time or the number of successive touches according to an embodiment of the present invention.

FIG. 6 illustrates a processing procedure when different user's input patterns are defined through different setting of a touch continuation time or the number of successive touches according to another embodiment of the present invention.

Referring to FIG. 6, the control unit 160 displays the dialog 310 through the display unit 140, and if a user input occurs through the auxiliary input regions 410, 420 and 430 set in the region other than that of the dialog 310 in step 605, the control unit 160 determines whether the user's input pattern corresponds to a predefined pattern.

Specifically, the control unit 160 determines whether the user's touch operation for the auxiliary input regions 410, 420, and 430 in step 610 is maintained for longer than a reference time, and if the touch continuation time is longer than the reference time, the control unit 160 controls the terminal 100 to perform the corresponding operation in step 615.

If the user's touch operation for the auxiliary input regions 410, 420, and 430 is not maintained longer than the reference time, that is, if a short touch operation is made, the control unit 160 determines whether the number of successive short touches in step 620 is equal to a reference number.

If the number of user's successive short touches is equal to the reference number, the control unit 160 controls the terminal 100 to perform the operation set corresponding to the number of short touches in step 625.

If a user input occurs through the auxiliary input regions 410, 420, and 430, the control unit 160 according to an embodiment of the present invention performs the corresponding operation of the terminal 100 immediately when the input is made in the same manner as when the user touches the selection buttons 330 and 340 of the dialog 310. However, unlike when the input is made through the selection buttons 330 and 340, when the input is an indirect input through the auxiliary input regions 410, 420, and 430, the control unit 160 performs the operation of the terminal 100 after performing an additional confirmation process.

Specifically, if the user input is made through the auxiliary input regions 410, 420, and 430 and the input pattern corresponds to the predefined input pattern, the control unit 160 displays the selected button 330 or 340, which corresponds to the user input, of the selection buttons 330 and 340 of the dialog 310 in a highlighted manner, to enable the user to confirm whether the input is the input intended by the user.

If there is no additional input for a time after the selection button 330 or 340 is displayed in a highlighted manner, the control unit 160 determines that the command intended by the user is input, and controls the terminal 100 to perform the corresponding operation. If an additional input, such as the user's touch of the screen, occurs after the selection button 330 or 340 is displayed in a highlighted manner, the control unit 160 determines to cancel the operation to be performed.

According to an embodiment of the present invention as described above, the user can input a command using the separate auxiliary input regions 410, 420, and 430 when it is difficult for the user to operate the dialog 310 displayed in the center of the display unit 140 with one hand, further enhancing the user convenience that is an advantage of the portable device herein.

In addition to an embodiment in which the position of the dialog 310 is fixed and the command input through the auxiliary input regions 410, 420, and 430 is determined to be the same as the input through the selection buttons 330 and 340 of the dialog 310, it is also possible to move the position of the dialog 310 to facilitate the user operation as another embodiment of the present invention.

In particular, in addition to the selection buttons 330 and 340, if for example a check box, a list box, and an edit box are included in the dialog 310, or if the number of selectable cases is too large to replace the input through the dialog 310 only by an input pattern such as a ouch, the above-described embodiment can be applied.

Figure 7A:
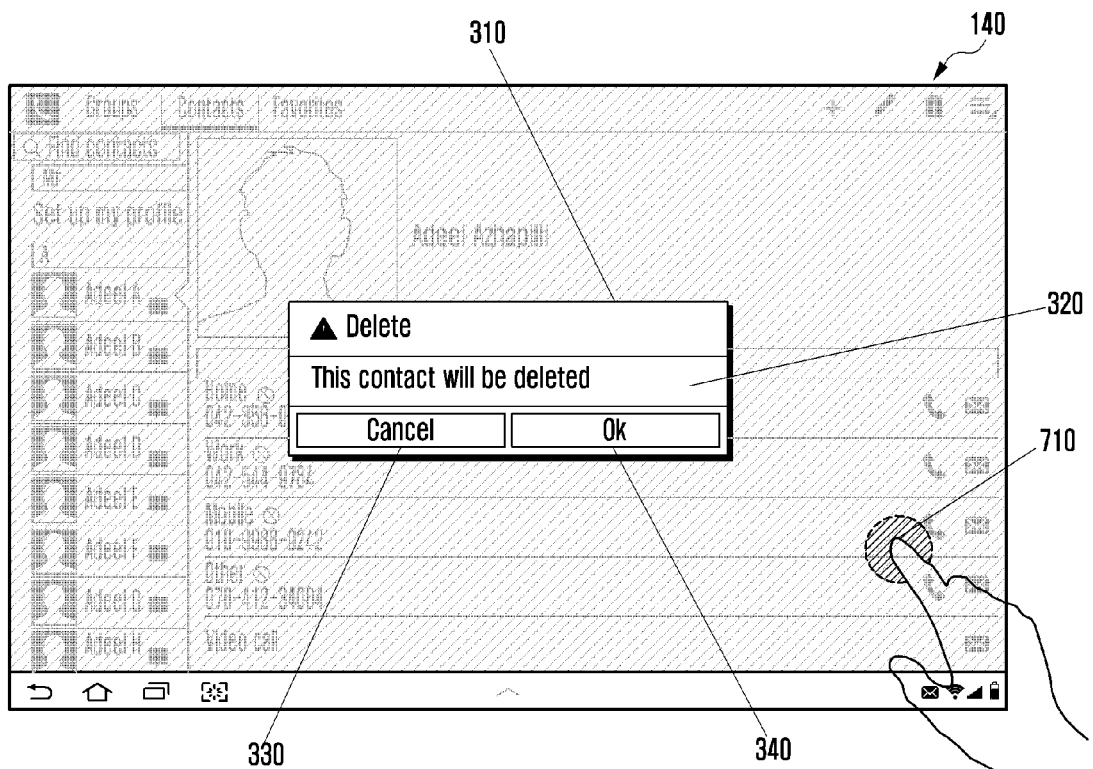
FIGS. 7A and 7B illustrate when a dialog is moved to a position that is touched by a user according to an embodiment of the present invention.
Figure 7B:
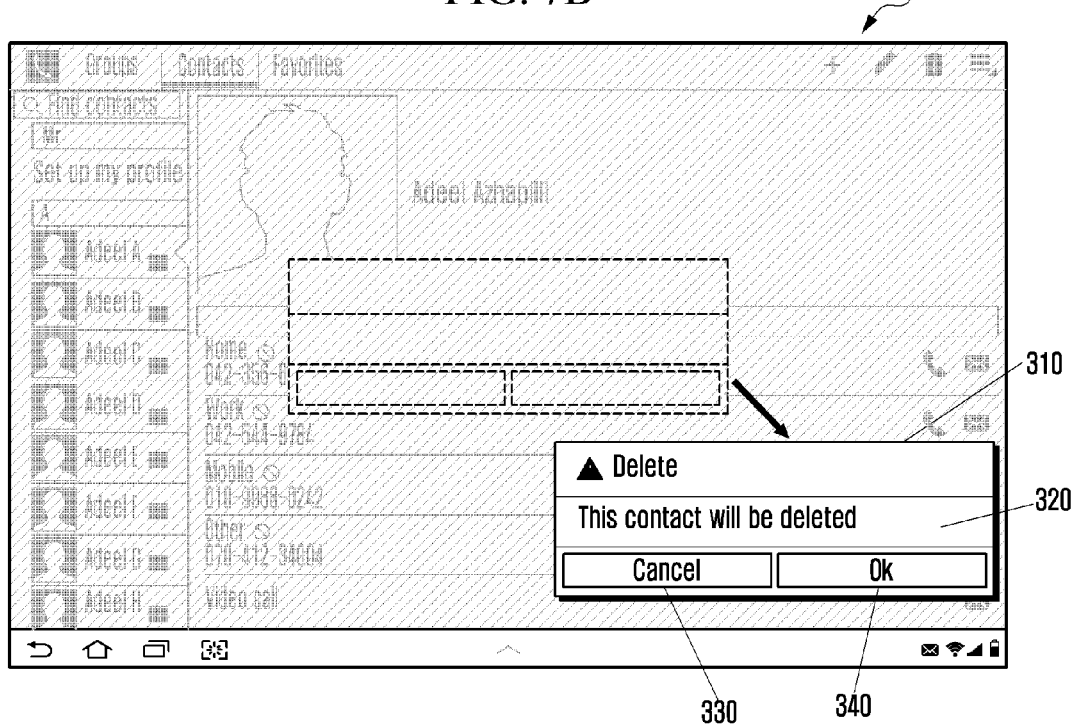

FIGS. 7A and 7B illustrate when a dialog is moved to a position that is touched by a user according to another embodiment of the present invention.

If a user touch in made at a touch point 710 in the region other than the region in which the dialog 310 is displayed when the dialog 310 is displayed in the center of the display unit 140 as shown in FIG. 7A, the control unit 160 may move the position of the dialog 310 to the touch point 710 of the display unit 140 as shown in FIG. 7B to display the dialog 310. The center of the dialog 310 may coincide with the touch point 710, but the present embodiment is not limited thereto. The position of the dialog 310 is variously changeable in consideration of the position of the touch point 710 and the size of the dialog 310.

As described above, if the dialog 310 is to be moved to the point 710 which is touched by the user to display the dialog 310 at a moved location, the entire region other than the region where the dialog 310 is displayed in the display unit 140 is set as the auxiliary input region, and thus the user can touch a position to which the dialog 310 is to be moved at which the user can conveniently operate the dialog in a direct manner.

When moving the position of the dialog 310, the arrangement of the selection buttons 330 and 340 in the dialog 310 is changed to a form that the user can conveniently operate. For example, in the embodiment of the FIG. 7, although the selection buttons 330 and 340 are arranged horizontally in a line on left and right sides, the selection buttons 330 and 340 are modified to be arranged above and below each other in a line on upper and lower sides when moving the dialog 310 to the point 710 that is touched by the user.

It will be understood by those of ordinary skill in the art to which the present invention pertains that various changes in form and detail could be made therein without changing the technical idea or essential features of the present invention. Accordingly, it will be understood that the above-described embodiments do not limit the scope of the present invention. Accordingly, the scope of the present invention is defined by the appended claims, and it will be construed that all changes and modifications derived from the meanings and scope of the following claims and the equivalent concept fall within the scope of the present invention.

Although certain embodiments of the present invention have been described in the specification and drawings and specific wordings have been used, these are merely used to assist those of ordinary skill in the art to gain a comprehensive understanding of the invention, and do not limit the scope of the present invention. It will be apparent to those of ordinary skill in the art to which the present invention pertains that various modifications are possible on the basis of the technical concept of the present invention in addition to the embodiments disclosed herein.

What is claimed is:

1. An input processing apparatus for controlling an operation of a terminal according to an input command, comprising:
a display unit configured to provide visual information; and
a control unit configured to control the display unit to display a dialog window comprising a plurality of selection buttons, each of the plurality of selection buttons corresponding to a respective command of at least two commands, to set a plurality of auxiliary input regions in a display region other than a region where the dialog window is displayed, each of the plurality of auxiliary input regions corresponding to a respective selection button of the plurality of selection buttons, to receive an input of a command among the at least two commands through an auxiliary input region of the plurality of auxiliary input regions, and to perform an operation corresponding to the command.

2. The input processing apparatus of claim 1, wherein the control unit is configured to control the display unit to display an explanation of a command to be input through the auxiliary input region at a location where the auxiliary input region is set in the display unit.

3. The input processing apparatus of claim 1, further comprising a storage unit configured to store at least one input pattern that is pre-defined with respect to a command among the at least two commands,
Wherein the control unit is further configured to determine whether an input pattern that is input through the auxiliary input region corresponds to the stored at least one input pattern.

4. The input processing apparatus of claim 3, wherein the stored at least one input pattern corresponds to the plurality of selection buttons.

5. The input processing apparatus of claim 4, wherein the control unit is configured to set the plurality of auxiliary input regions that correspond to the at least one input pattern.

6. The input processing apparatus of claim 3, wherein the control unit is configured to control the display unit to display an explanation of the at least one input pattern on the display unit.

7. The input processing apparatus of claim 3, wherein the input pattern is defined by at least one of a number of successive touches on the display unit, a touch continuation time, and a drag direction in a touching state.

8. The input processing apparatus of claim 1, wherein the control unit is further configured to control:
receiving an input of a command for moving a position of the dialog window; and
moving the position of the dialog window to a location in the auxiliary input region according to the input of the command for moving the position of the dialog window.

9. An input processing method for controlling an operation of a terminal according to an input command, the input processing method comprising:

displaying a dialog window comprising a plurality of selection buttons, each of the plurality of selection buttons corresponding to a respective command of at least two commands;

set a plurality of auxiliary input regions in a display region other than a region where the dialog window is displayed, each of the plurality of auxiliary input regions corresponding to a respective selection button of the plurality of selection buttons, receiving an input of a command among the at least two commands through an auxiliary input region of the plurality of auxiliary input regions;

controlling the terminal to perform an operation corresponding to the command.

10. The input processing method of claim 9, wherein the displaying of the dialog window comprises displaying an explanation of a command to be input through the auxiliary input region at a location where the auxiliary input region is set.

11. The input processing method of claim 9, further comprising:

storing at least one input pattern that is pre-defined with respect to a command among the at least two commands; and determining whether an input pattern that is input through the auxiliary input region corresponds to the stored at least one input pattern.

12. The input processing method of claim 11, wherein the stored at least one input pattern corresponds to the plurality of selection buttons.

13. The input processing method of claim 12, wherein the plurality of auxiliary input regions is set to correspond to the at least one input pattern.

14. The input processing method of claim 11, wherein the displaying of the dialog window comprises displaying an explanation of the at least one input pattern.

15. The input processing method of claim 11, wherein the input pattern is defined by at least one of a number of successive touches, a touch continuation time, and a drag direction in a touching state.

16. The input processing method of claim 9, further comprising:

receiving an input of a command for moving a position of the dialog window; and moving the position of the dialog window to a location in the auxiliary input region according to the input of the command for moving the position of the dialog window.

\* \* \* \* \*